United States Patent [19]

Benkmann

[11] 4,326,858

[45] Apr. 27, 1982

[54] PRESSURE BUILDUP TECHNIQUE IN PRESSURE SWING ADSORPTION PROCESS

[75] Inventor: Christian Benkmann, Munich, Fed. Rep. of Germany

[73] Assignee: Linde Aktiengesellschaft, Wiesbaden, Fed. Rep. of Germany

[21] Appl. No.: 911,556

[22] Filed: May 31, 1978

[30] Foreign Application Priority Data

Jun. 1, 1977 [DE] Fed. Rep. of Germany ....... 2724763

[51] Int. Cl.³ ............................................ B01D 53/04
[52] U.S. Cl. ........................................ 55/26; 55/31;
55/33; 55/58; 55/68; 55/74; 55/75
[58] Field of Search ................... 55/25, 26, 31, 33, 58,
55/68, 74, 75

[56] References Cited

U.S. PATENT DOCUMENTS

| | | | |
|---|---|---|---|
| 3,102,013 | 8/1963 | Skarstrom | 55/31 |
| 3,221,476 | 12/1965 | Meyer | 55/31 X |
| 3,306,841 | 2/1967 | Ward | 55/58 X |
| 3,365,859 | 1/1968 | Sandberg | 55/25 |
| 3,436,839 | 4/1969 | Ellington | 55/33 X |
| 3,636,679 | 1/1972 | Batta | 55/26 |
| 3,719,025 | 3/1973 | Heinze et al. | 55/31 |
| 3,796,022 | 3/1974 | Simonet et al. | 55/33 X |
| 3,923,477 | 12/1975 | Armond et al. | 55/25 |

Primary Examiner—Robert H. Spitzer
Attorney, Agent, or Firm—Millen & White

[57] ABSTRACT

In a pressure swing adsorption process for the separation of gases comprising the steps of passing crude gas under a superatmospheric adsorption pressure through a drying bed of $H_2O$-selective adsorbent to remove gaseous $H_2O$ and then passing resultant $H_2O$-free gas sequentially through a separate and distinct zeolite-containing adsorbent bed for the removal of low-boiling impurities and the further steps of pressure release, desorption and pressure buildup to adsorption pressure, the improvement in the pressure buildup step which comprises introducing an $H_2O$-depleted gas obtained during said process to a point intermediate the drying bed and said zeolite-containing adsorbent bed and passing said $H_2O$-depleted gas into the drying bed in a countercurrent direction to the flow of crude gas and into the zeolite-containing adsorbent bed in a cocurrent direction to the flow of crude gas, and continuing said passing of said $H_2O$-depleted gas until the pressure buildup is at least 20% of the adsorption pressure.

11 Claims, 2 Drawing Figures

PRESSURE BUILDUP TECHNIQUE IN PRESSURE SWING ADSORPTION PROCESS

BACKGROUND OF THE INVENTION

The invention relates to a pressure swing adsorption process for the purification and separation of a gaseous mixture, and in particular to a sequential system wherein certain components, e.g. $H_2O$ are removed by adsorption in a first adsorption bed and certain other components are removed in a downstream second adsorption bed.

For the past several years, pressure swing gas adsorption processes have proven to be practicable for many purposes. In these processes, the adsorption occurs at a higher pressure than the desorption of the previously adsorbed components, which desorption is simply effected by a pressure drop, optionally until subatmospheric pressure and optionally by the additional use of a purge gas. The changes in pressure occur in a period of time measuring only minutes or seconds. A further, essential feature of the known pressure swing processes is the fact that neither heating at desorption nor cooling at adsorption is required. Consequently, since these processes take place essentially at a constant temperature, preferably at room temperature, they are extraordinarily favorable in terms of energy. In the conventional pressure swing methods, an adsorption zone of the preferably adsorbed components is produced within the adsorbent bed, and the front of this zone travels towards the outlet of the adsorber during the adsorption step and is displaced in the opposite direction during desorption, so that the front oscillates back and forth, in both steps. This adsorption front is called the "charging front" or "adsorption wave."

A conventional process of this type, the details being incorporated by reference herein, is described in DOS [German Unexamined Laid-Open Application] No. 2,055,425, and British patent specification No. 1,375,728.

If zeolites are employed for the separation of a gas mixture, then steps must be taken to ensure that the gas mixture to be separated enters the adsorbers largely predried, i.e., pre-purified; otherwise, the zeolites, due to their lattice structure, will selectively adsorb water over all other substances, resulting in the substantial if not total reduction in the adsorption capacity of the zeolites for the other components. In the conventional process which relates to the production of a fraction enriched with oxygen compared to the air, distinct and separate adsorbent-type dryers are therefore connected upstream of the product adsorbers. These dryers are filled with a water-selective adsorbent, e.g., silica gel or zeolite.

Since the dryer-adsorber pair is always connected by a conduit, the buildup of the adsorption pressure in both containers creates a special problem in the conventional process. Therefore, in the conventional process a throttle point is installed between the two containers, which throttle point permits the increase in pressure in the product adsorber to be slowed down during the buildup with crude gas which takes place from the inlet end of the dryer.

Aside from the special throttle point, the conventional process displays some significant disadvantages. Firstly, for the process to be conducted, there is always the requirement for two separate containers connected by a conduit for the drying and adsorption means. Secondly, the gas needed for the re-compression of the adsorber must be introduced by way of the inlet to the dryer. In that way the water charging front is displaced in the dryer in the direction of the outlet end of said dryer, and this means that after a prolonged operation, the water charging front does approach the outlet end of the dryer, and the water front may break through and penetrate the main adsorber. To guard against this possibility, the dryer must be substantially oversized.

A pressure buildup with a dry and $CO_2$-free gas, like the one produced, for example, in the conventional process from the cocurrent expansion of an adsorber, can only be carried out by passing said gas into the outlet end of the adsorber which in turn leads to an undesired contamination of the outlet layer of zeolite with unadsorbed low boiling impurities, e.g., nitrogen present in the dry and $CO_2$-free gas. Conversely, if such a gas is introduced by way of the dryer, the danger exists that water from the dryer is desorbed by this gas and carried into the zeolite layer. Thus, if a product of high purity is to be produced with the conventional process, it is necessary to forego the utilization of this gas, thereby resulting in poorer yields of product gas.

SUMMARY OF THE INVENTION

An object of one aspect of this invention is to reduce or eliminate these aforementioned disadvantages and to provide an improved pressure swing process which will permit gases contaminated with water, $CO_2$, or other higher boiling components to be more economically and more reliably separated than previously.

Upon further study of the specification and appended claims, further objects and advantages of this invention will become apparent to those skilled in the art.

The improved process of this invention comprises the feature that the buildup of the adsorption pressure necessary after desorption is provided to the extent of at least 20% of the adsorption pressure by introducing an $H_2O$-depleted gas obtained during said process to a point intermediate the drying bed and said zeolite-containing adsorbent bed and passing said $H_2O$ depleted gas into the drying bed in a countercurrent direction to the flow of crude gas and into the zeolite-containing adsorbent bed in a cocurrent direction to the flow of crude gas, and continuing said passing of said $H_2O$-depleted gas until the pressure buildup is at least 20% of the adsorption pressure. (The dryer bed will be interchangeably referred to as a purification bed, and as opposed to the prior art, need not be contained in a separate housing.)

Thus, in the process of the invention, the pressure buildup is not accomplished, as in the conventional process, by the introduction of a gas by way of the inlet to the purification bed, but rather by the introduction at a position located between the purification bed and the adsorption bed. The process of the invention is applicable to all gases which comprise essentially two groups of components, one boiling relatively lower and one boiling relatively higher or with other words: to all gases where low boiling components, such as oxygen, nitrogen, rare gases, hydrogen, carbon monoxide or methane, are "contaminated" with high boiling impurities, such as water, carbon dioxide, hydrogen sulfide, ozone, chlorine, ammonia, nitrous oxide and $C_{2+}$-hydrocarbons.

(Whereas a process is known from German Pat. No. 1,769,135, wherein a gas is blown in between two beds of molecular sieves located in a container, the process of this patent is based on a changing-temperature method, not a pressure swing method; so that this reference is not suggestive of any solutions to problems involved in pressure swing methods. In addition, this conventional process is concerned with being able to regenerate only the larger quantity of adsorbent, which serves for the adsorption of $CO_2$, separate from the smaller quantity of adsorbent, which acts as the dryer. To this end, a lateral tap is provided between the two zeolite beds, and the regenerating gas is conveyed either in or out of this lateral tap, which in principle represents no difference in the conventional process, wherein attention is paid solely to the fact that the circulated regenerating gas flows only once through the dryer at the very end. Therefore this known process of German Pat. No. 1,769,135 is truly not relevant to the pressure buildup process of this invention.)

The process according to the invention has the advantage that residual deposits of $H_2O$, $CO_2$, or optionally also other impurities, present on the purification bed are forced in the direction towards the inlet end of the purification bed by the pressure buildup, so that a purer gas flows over from the purification bed into the adsorption bed after a switching over to adsorption.

The process according to the invention also offers a special advantage when several adsorbers are used, because the pressure release gas flowing out from the outlet end of one adsorber can be utilized for at least the partial pressure buildup of another adsorber. In this way, a significantly higher product yield can be attained than with the conventional process. Because this released gas (the unadsorbed gas remaining in the adsorber after adsorption) is introduced into the adsorption bed by way of its inlet end, an anhydrous and $CO_2$-free gas can be utilized which even contains components which are to be removed in the adsorption step, without a decrease in the product purity. Thereby it is not necessary, for instance, to reserve adsorption capacity in the adsorption bed for this expansion cycle in order to prevent the penetration of the adsorbent front.

The process of this invention can be applied to all gas mixtures requiring a purification stage in a pressure swing adsorption process. Such gases contain on the one hand, generally water and/or $CO_2$ and/or optionally also high-boiling (above 160° K.) impurities, and, on the other hand, several components of which at least one is to be obtained in substantially pure form.

Thus, by the process of this invention, pure oxygen or oxygen-rich air can, for example, be obtained from air, which pure oxygen or oxygen-rich air can be utilized in chemical industry, in the iron and steel industry, in combustion processes, or in waste water processing. The process according to the invention can also be employed in like manner to extract or enrich hydrogen from a steam reforming gas. Furthermore, the process according to the invention can also be successfully applied for the separation of hydrocarbon mixtures which are gaseous at normal temperature.

To conduct the process of this invention, the purification bed and the adsorbent bed are advantageously arranged in one single adsorber. Thus, a construction is involved which is significantly simpler and cheaper than the two separate adsorbers required by the process of the prior art.

The pressure buildup according to the invention which occurs by the introduction of a compressed gas between the two adsorbent beds, is advantageously conducted by using, as the compressed gas, a fraction obtained during the separation process. The utilization of such a process fraction entails the advantage that a gas is used which is free from the components of the crude gas deposited in the purification bed, so that residual deposits in the purification bed are pushed back in the direction towards the inlet end, without a simultaneous contamination of the adsorption bed. The pure gaseous product can be considered as such a process fraction, for example. Likewise, the gas remaining in the interstices of an adsorber after the conclusion of the adsorption step, can be introduced into the adsorber to be re-compressed, by way of a pressure equalization. In using this pressure equalization or released gas, a process fraction is employed which would otherwise be discharged as residual gas. In any case, the process fraction is $H_2O$-depleted insofar as it has traversed the purification bed.

As a rule, the introduction of the process fraction between the two adsorbent beds is conducted until the pressure builds up to at least 20% of the adsorption pressure, and preferably to 20 to 60%, especially 30 to 40% of the adsorption pressure. This pressure buildup suffices to prevent a penetration of the water adsorption front into the adsorber upon further pressure buildup. Thus, according to the invention, the final pressure buildup to adsorption pressure is economically conducted with crude gas blown into the inlet end of the purification bed, then serially into the adsorber, thus maintaining the adsorber bed free of $H_2O$, $CO_2$, and optionally also other impurities, and without diminishing its adsorption capacity unnecessarily. Moreover, because the first essential pressure increase has already been completed, it is relatively safe to use the crude gas for the pressure buildup in this process variant without the danger that $H_2O$, $CO_2$, etc. impurities would penetrate through to the adsorption bed, which would be undesirable in any case.

In accordance with a further aspect of the invention, two adsorbers of an adsorber battery are directly connected one after the other without the use of an intermediate purification bed for the second adsorber. Thus, in this process variant, the crude gas flows consecutively through a purification bed, a first, and a second adsorption bed. By this aspect of the invention, there is the advantage that the capacity of the first adsorption bed is completely consumed, insofar as the charging front of the first adsorber can penetrate the second adsorption bed without the occurrence of any contamination of the pure gas to be extracted. In this manner, the first adsorption bed is charged to the complete exhaustion of its capacity and the second one is charged to not more than about 50%, preferably to 25 to 40%, thereby yielding a very favorable method of conducting the process.

The purification and adsorption beds according to the invention can be equipped with any conventional adsorption agents. They must only achieve the desired purpose. Thus, silica gel, activated carbon, alumina gel, and zeolites have proven useful for the purification beds, and zeolites and activated carbon have proven useful for the adsorption beds, wherein the type of zeolite to be selected depends upon the type of separation desired. Generally, for reasons of economics, it is preferable for the purification bed to consist essentially of a non-zeolite or a different zeolite adsorbent, when the adsorbent bed itself comprises zeolites.

The duration of a switching cycle in the process according to the invention can vary. Generally, the duration is 10 to 20 minutes. However, it can be decreased to 5 minutes, for example, and in extreme cases it can be even only a few seconds.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with accompanying drawings in which:

It is to be understood that the invention is not limited to systems having three adsorbers, but in the same manner, it can also be applied to those having more adsorbers, especially if, for example, complete pressure buildup and pressure drop is to be accomplished in several individual stages, which requires the connection of additional adsorbers as a rule.

DETAILED DESCRIPTION OF THE DRAWINGS

Figure 1:
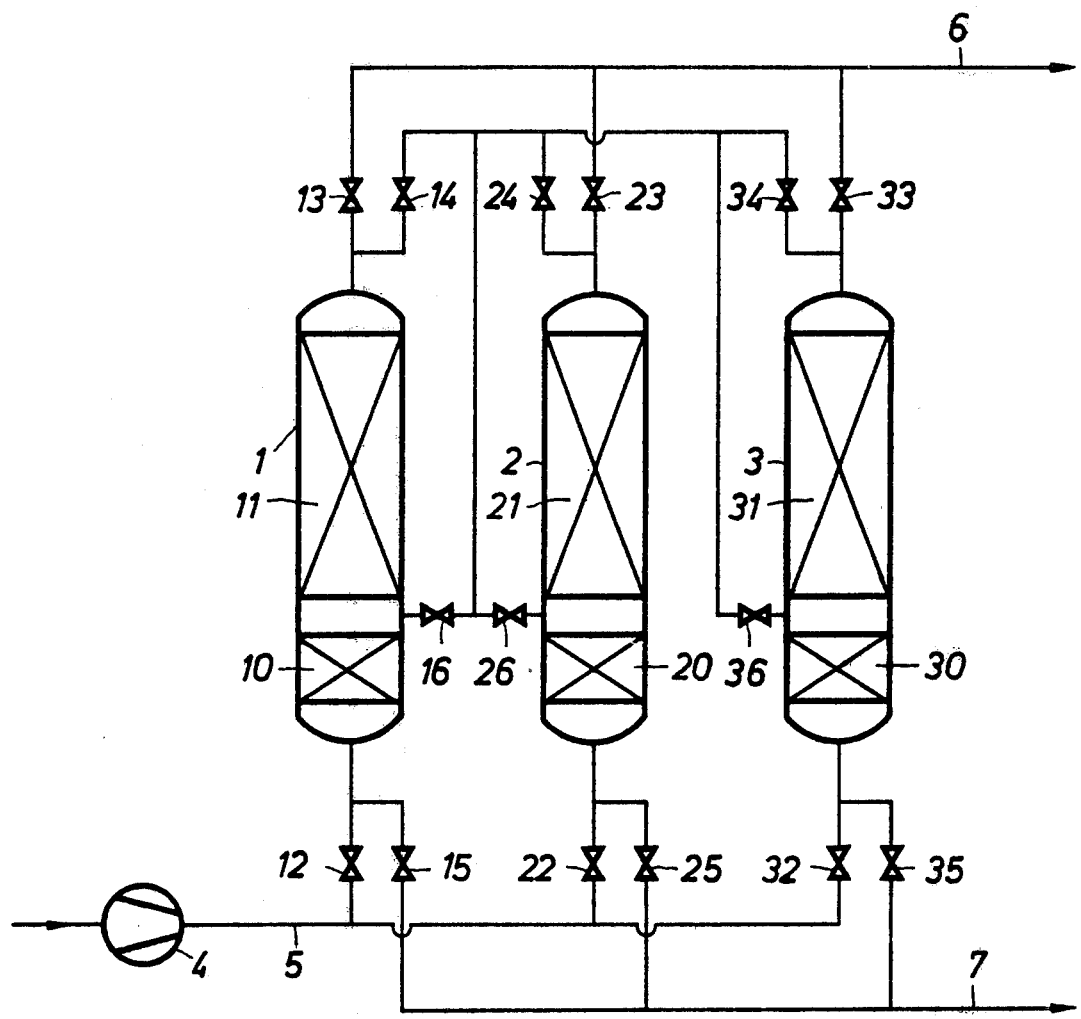
FIG. 1 is a schematic flowsheet of the invention based on three product adsorbers.

The system shown in FIG. 1 comprises three adsorbers 1, 2 and 3 with the purification beds 10, 20, and 30 and the adsorption beds 11, 21 and 31. In a compressor 4 the crude gas is compressed to the pressure required for adsorption and this crude gas is supplied by way of a conduit 5 and a valve 12 to the purification bed 10 of the adsorber 1, where $H_2O$, $CO_2$, and optionally other components are separated. Immediately thereafter, the gas pre-purified in this manner enters the adsorption bed 11 of the adsorber 1, where one or more components of the pre-purified crude gas are selectively adsorbed. The pure gas from which these components have been released flows out through a valve 13 and a pure gas conduit 6.

When the adsorption front of the preferably adsorbed components reaches the end of the adsorption bed 11 of the adsorber 1, then the valves 12 and 13 are closed and the crude gas is conveyed by the opening of the valves 22 and 23 through the purification bed 20 and the adsorption bed 21 of the adsorber 2 where the same process is repeated. A valve 14 is simultaneously opened and the pressure gas thereby flowing out of the adsorber 1 enters, after the opening of a valve 36, between the adsorption bed 31 and the purification bed 30, (which at this point in time are at the lowest process pressure) in order to partially build up the pressure there. After the successful pressure equilization, the valves 14 and 36 are closed again.

Then the desorption of the components adsorbed in the purification bed 10 and in the adsorption bed 11 of the adsorber 1 occurs. To this end a valve 15 is opened and the pressure in the adsorber 1 is further decreased. Residual gas flows out through a conduit 7. The lowering of pressure is interrupted at the lowest process pressure by the closing of the valve 15, wherein this lowest process pressure can optionally be atmospheric pressure or, if necessary, even a lower pressure which can be attained with the aid of a vacuum pump incorporated into the conduit 7 and not shown in the figure. In case it is preferable not to work at subatmospheric pressure, it can be advantageous to introduce by the opening of valves 14 and 24 some pure gas into the adsorber 1 from its outlet end forward to support the desorption while the valve 15 remains open.

Now the pressure in adsorber 1 must be built up again. This occurs by the introduction of expansion gas from the adsorber 2, whose adsorption phase has just ended, by way of the valves 24 and 16. Because this pressure buildup occurs with dry, $CO_2$-free gas for the purification bed 10 and countercurrent to the adsorption, residual deposits remaining there after desorption are pushed back in the direction towards the inlet end of the purification bed, i.e. the effect of the previous desorption is thereby increased, with the net result that the required size of the purifier bed is decreased.

The further pressure buildup to the adsorption pressure takes place after the closing of the valves 24 and 16 by opening the valve 12, due to the introduction of moist crude gas into the purification bed 10 and the adsorption bed 11 of the adsorber 1. After the pressure buildup has been concluded, the valve 13 is opened and the cycle sequence described here begins again.

To carry out the second process variant, the valve 13 is closed and the valves 14 and 26 are opened as soon as the adsorption front of the adsorbed component reaches the end of the adsorber 1. By opening valve 23, pure gas again flows out through the conduit 6. The adsorption cycle is then concluded when the mass transfer zone has completely gone over into the adsorption bed 21 of the adsorber 2.

(It is to be noted that valve 33 has the same function as valves 23 and 14 in their operating modes. Likewise, valves 25 and 35 have the same function as valve 15 in its operating mode.)

Figure 2:
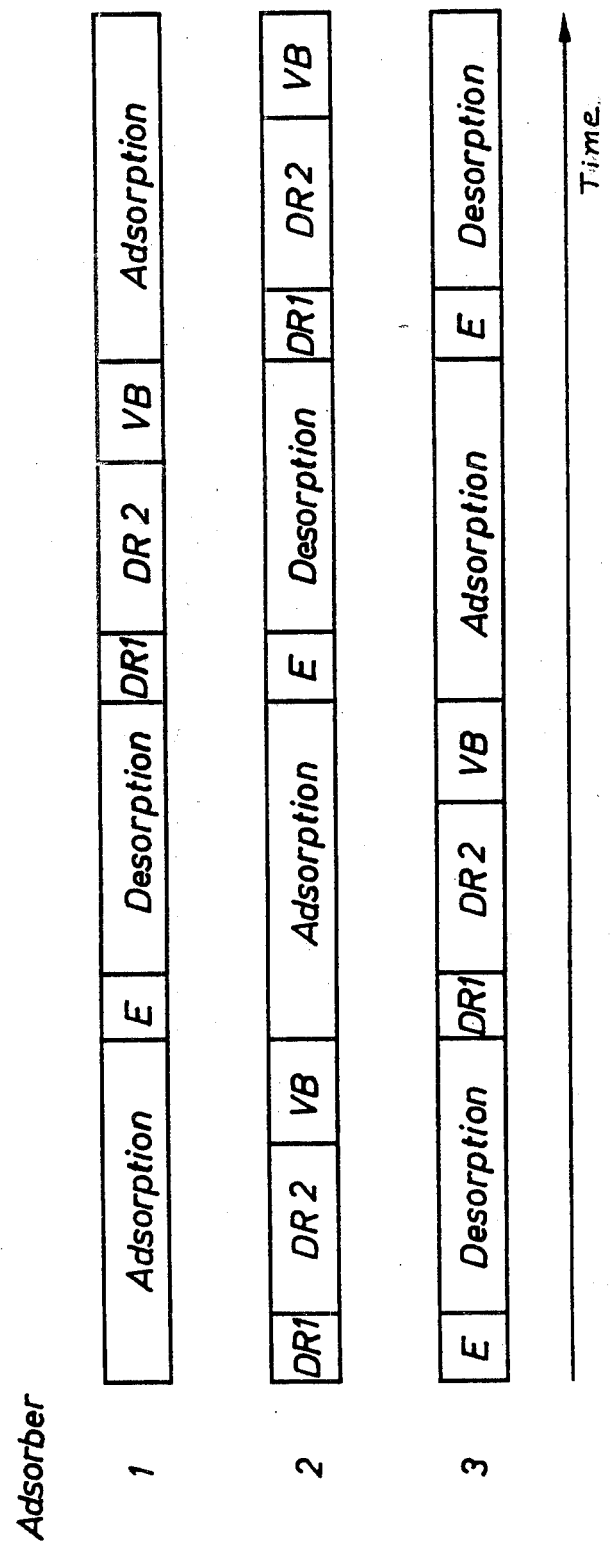
FIG. 2 is a time sequence chart showing the operating modes of the three adsorbers during the process.

Referring to FIG. 2, the top bar represents the sequence of the process steps in adsorber 1, the middle bar represents the sequence in adsorber 2, and the bottom bar represents the sequence in adsorber 3. In the diagram, "E" stands for expansion which occurs with another adsorber at simultaneous pressure equalization. "DR1" and "DR2" designate the two pressure buildup steps—first by expansion gas from another adsorber and secondly with the aid of crude gas. "VB" means the period of precharging, if in accordance with the second process variant of the invention two adsorption beds are connected one after the other until the mass transfer zone has completely entered into the second adsorption bed. If this process step is omitted, then the time available for the pressure buildup DR2 is increased by the corresponding amount.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

This example shows the extraction of an $O_2$-rich fraction from the air, wherein the gas to be separated is made to flow through only one adsorption bed.

In the process, three adsorbers, with one purification bed and one adsorption bed respectively, were employed. Each purification bed was charged with 150 kg. of large-pored silica gel (pore diameter being 0.003 to 0.015 microns) or 150 kg. of activated alumina and activated carbon, each adsorption bed was charged with 2,750 kg. of zeolite molecular sieve Type 5A.

| | |
|---|---|
| Adsorption time: | 3 minutes |
| Cycle time: | 9 minutes |
| Feed gas: | 861 Nm$^3$/h of air with a water content of 4.8 g./Nm$^3$ and a CO$_2$-content of 330 v.p.m. |
| Adsorption pressure: | 4 bar (abs.) |
| Adsorption temperature: | 293 K. |
| Desorption pressure: | 0.15 bar (abs.) |
| Product: | 150 Nm$^3$/h (dry and free from CO$_2$) |
| Product composition: | 90 vol. % O$_2$ |
| | 6 vol. % N$_2$ |
| | 4 vol. % Ar. |
| Product pressure: | 3.7 bar (abs.). |

In this example, the pressure buildup was effected with expansion gas from 0.15 to 1.6 bar (abs.) and with compressed air from 1.6 to 4 bar (abs.). The oxygen recovery amounted to 50%.

EXAMPLE 2

In this example, which likewise shows the production of an O$_2$-rich fraction from the air, the second variant of the process according to the invention is used, i.e. the gas flows through two adsorption beds in succession.

In the process three adsorbers with one purification bed and one adsorption bed respectively were utilized. Each purification bed was charged with 120 kg. of large-pored silica gel or 120 kg. of activated alumina and activated carbon, each adsorption bed was charged with 2,250 kg. of zeolitic molecular sieve Type 5A.

| | |
|---|---|
| Adsorption time: | 3 minutes |
| Cycle tine: | 9 minutes |
| Feed gas: | 694 Nm$^3$/h of air with a water content of 4.8 g./Nm$^3$ and a CO$_2$-content of 330 v.p.m. |
| Adsorption pressure: | 4 bar (abs.) |
| Adsorption temperature: | 293 K. |
| Desorption pressure: | 0.15 bar (abs.) |
| Product: | 150 Nm$^3$/h (dry and free from CO$_2$) |
| Product composition: | 90 vol. % O$_2$ |
| | 6 vol. % N$_2$ |
| | 4 vol. % Ar |
| Product pressure: | 3.7 bar (abs.) |

In this example, the pressure buildup was effected with expansion gas from 0.15 to 1.6 bar (abs.) and with compressed air from 1.6 to 4 bars (abs.). The preloading of the second bed amounted to about 35% and the oxygen recovery to 62%.

EXAMPLE 3

In this example air was separated in an adsorber system of conventional type, i.e. neither the pressure equilization according to the invention nor a connecting of adsorbers one after the other took place.

In this process, three adsorbers with one purification bed and one adsorption bed respectively were used. Each purification bed was charged with 250 kg. of large-pored silica gel or 250 kg. of activated alumina and activated carbon, each adsorption bed was charged with 3,500 kg. of molecular sieve Type 5A.

| | |
|---|---|
| Adsorption time: | 3 minutes |
| Cycle time: | 9 minutes |
| Feed gas: | 1,320 Nm$^3$/h of air with a water content of 4.8 g./Nm$^3$ and a CO$_2$-content of 330 v.p.m. |
| Adsorption pressure: | 4 bar (abs.) |
| Adsorption temperature: | 293 K. |

-continued

| | |
|---|---|
| Desorption pressure: | 0.15 bar (abs.) |
| Product: | 150 Nm$^3$h (dry and free from CO$_2$) |
| Product composition: | 90 vol. % O$_2$ |
| | 6 vol. % N$_2$ |
| | 4 vol. % Ar |
| Product pressure: | 3.7 bar (abs.) |

In this example, which is given for comparative purposes, the pressure buildup was effected with atmospheric air from 0.15 to 1 bar (abs.) and with compressed air from 1 to 4 bar (abs.). The oxygen recovery amounted to 37%.

EXAMPLE 4

In this example the extraction of hydrogen from a steam reforming gas is demonstrated with the aid of the process according to the invention, wherein the gas to be separated is only made to flow through one adsorption bed.

In the process three adsorbers with one purification bed and one adsorption bed respectively were used. Each purification bed was charged with 100 kg. of activated alumina and 190 kg. of activated carbon, each adsorption bed was charged with 2,000 kg. of zeolitic molecular sieve of Type 5A.

| | |
|---|---|
| Adsorption time: | 4 minutes |
| Cycle time: | 12 minutes |
| Crude gas: | 1,000 Nm$^3$/h |
| Crude gas composition: | 72 vol. % H$_2$ |
| | 12 vol. % CO |
| | 13 vol. % CO$_2$ |
| | 3 vol. % CH$_4$ |
| Adsorption pressure: | 12 bar (abs.) |
| Adsorption temperature: | 303 K. |
| Desorption pressure: | 0.1 bar (abs.) |
| Product composition: | 99 vol. % H$_2$ |
| | 0.7 vol. % CH$_4$ |
| | 0.3 vol. % CO |
| | CO$_2$ less than 10 v.p.m. |
| | H$_2$O less than 1 v.p.m. |
| Product pressure: | 11.5 bar (abs.) |

In this example, the pressure buildup was effected from 0.15 to 6 bar (abs.) by expansion gas and from 6 bar to 12 bar (abs.) by crude gas. The hydrogen recovery amounted to 70%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. For example, the invention can be used with any gas which does not necessarily contain water or CO$_2$, so long as there is the requirement that one of the components must be removed in a purifier bed to avoid contamination of a downstream main adsorbent bed. In addition, the invention will be useful even where the desired product is selectively adsorbed in the main adsorber and then recovered during the desorption step.

What is claimed is:

1. In a pressure swing adsorption process for the separation of gases comprising the steps of passing crude gas under a superatmospheric adsorption pressure through a drying bed of H$_2$O-selective adsorbent to remove gaseous $H_2O$ and then passing resultant $H_2O$-free gas sequentially through a separate and distinct zeolite-containing adsorbent bed for the removal of low-boiling impurities and the further steps of pressure release, desorption and pressure buildup to adsorption pressure, the improvement in the pressure buildup step which comprises introducing an $H_2O$-depleted gas obtained during said process to a point intermediate the drying bed and said zeolite-containing adsorbent bed and passing said $H_2O$-depleted gas into the drying bed in a countercurrent direction to the flow of crude gas and into the zeolite-containing adsorbent bed in a cocurrent direction to the flow of crude gas, and continuing said passing of said $H_2O$-depleted gas until the pressure buildup is at least 20% of the adsorption pressure.

2. A process according to claim 1, wherein said pressure buildup occurs to the extent of 20 to 60% and the remaining buildup is conducted by passing crude gas into the system by way of the crude gas inlet to the drying bed.

3. A process according to claim 1, wherein said $H_2O$-depleted gas is product gas.

4. A process according to claim 1, wherein said $H_2O$-depleted gas is pressure equalization gas.

5. A process according to claim 1, wherein gas obtained from the outlet of the zeolite-containing bed during adsorption is passed directly into a second zeolite-containing adsorption bed until mass transfer occurs in said second bed but wherein said second bed is charged to not more than 50% of capacity.

6. A process according to claim 1, wherein said drying bed consists essentially of a non-zeolite adsorbent.

7. A process according to claim 1, wherein said drying bed consists essentially of silica gel.

8. A process according to claim 1, wherein said drying bed consists essentially of a mixture of activated alumina and activated carbon.

9. A process according to claim 1, wherein said crude gas is air and resultant product is oxygen-enriched air.

10. A process according to claim 1, wherein said crude gas is a steam reforming gas, and resultant product gas is hydrogen.

11. A process according to claim 1, wherein said pressure buildup with $H_2O$-depleted gas is terminated at 30-40% of the adsorption pressure.

* * * * *